United States Patent [19]

Zaidan

[11] 4,077,730
[45] Mar. 7, 1978

[54] COUPLING FOR TUBULAR SCAFFOLDING

[76] Inventor: Joseph Maurice Zaidan, P.O. Box 2217, Farra Bldg., Riad Solh St., Beirut, Lebanon

[21] Appl. No.: 503,495

[22] Filed: Sep. 5, 1974

Related U.S. Application Data

[63] Continuation-in-part of Ser. No. 399,156, Sep. 20, 1973, Pat. No. 3,861,1816.

[51] Int. Cl.² ............................................. F16B 7/00
[52] U.S. Cl. .................................... 403/385; 403/389
[58] Field of Search ............... 403/385, 399, 400, 395, 403/49, 317, 409

[56] References Cited

U.S. PATENT DOCUMENTS

| 2,152,891 | 4/1939 | Kohnke | 403/385 |
| 2,494,826 | 1/1950 | Mulder | 403/385 |
| 3,861,816 | 1/1975 | Zaidan | 403/385 |

FOREIGN PATENT DOCUMENTS

| 147,113 | 6/1952 | Australia | 403/399 |
| 1,286,193 | 1/1962 | France | 403/400 |
| 1,490,588 | 6/1967 | France | 403/399 |
| 348,060 | 3/1937 | Italy | 403/400 |
| 458,566 | 12/1936 | United Kingdom | 403/385 |

Primary Examiner—Andrew V. Kundrat
Attorney, Agent, or Firm—Watson, Cole, Grindle & Watson

[57] ABSTRACT

A coupling for connecting two scaffolding members. A central link is provided with two pairs of arms, each projecting from the link. Each arm is provided with an aperture. Each pair of arms are adapted to embrace a respective scaffolding member. A respective wedge is adapted to project through the apertures in a respective pair of arms so as to bear upon and retain in position an embraced scaffolding member. Each wedge is provided with a pair of stop members which serve to resist withdrawal of the wedge from the apertures.

12 Claims, 6 Drawing Figures

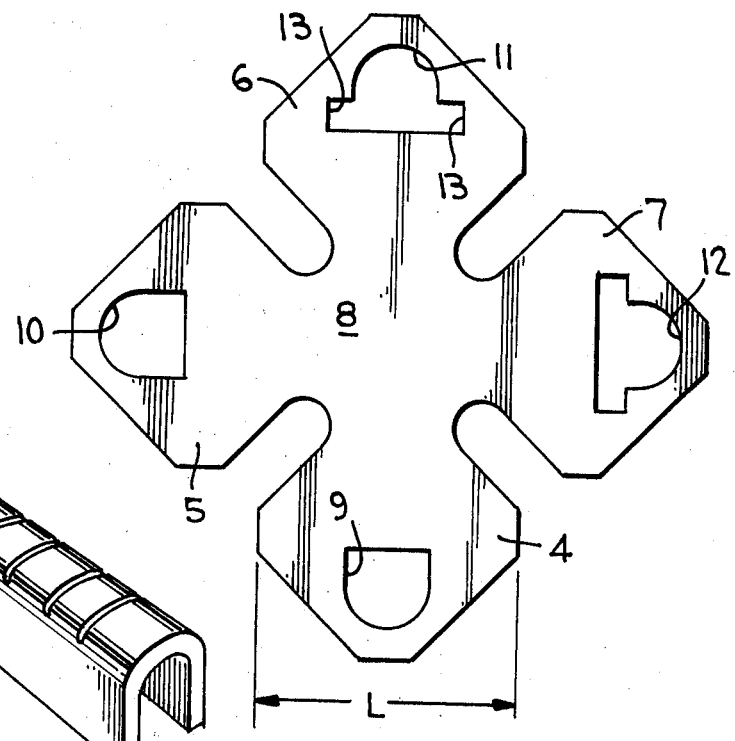
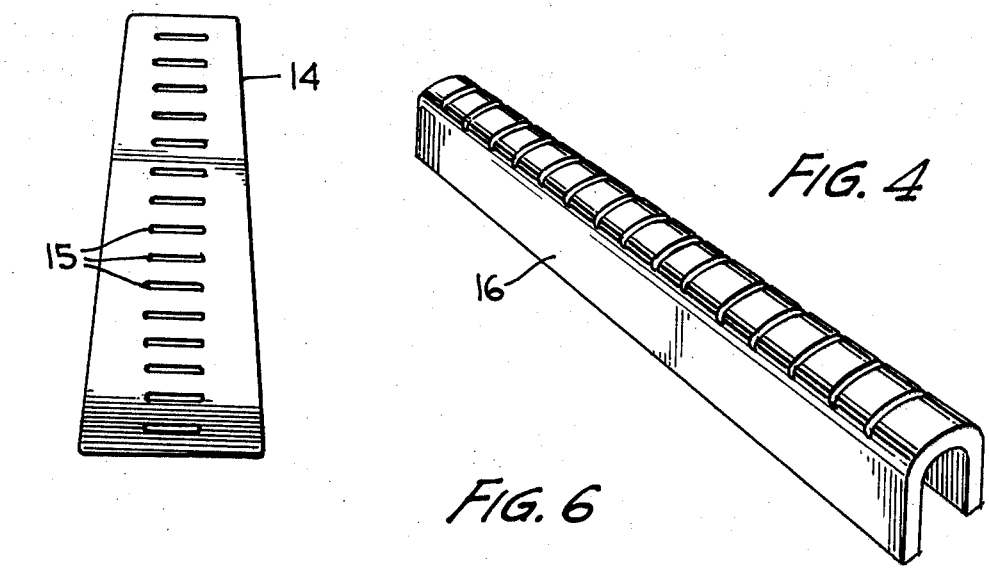
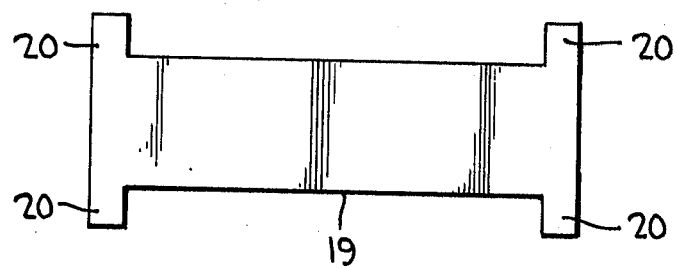

COUPLING FOR TUBULAR SCAFFOLDING

Related Application

The present application is a continuation-in-part application of application Ser. No. 399,156, filed Sept. 20th, 1973, to Joseph M. Zaidan and now U.S. Pat. No. 3,861,816.

BACKGROUND OF THE INVENTION

The present invention relates to a coupling for scaffolding.

Previously proposed couplings used for assembling scaffolding tubes include bolts and nuts which serve to connect the tubes to the coupling. The erection of scaffolding with couplings of this type represents a difficult and lengthy process because for each tube connection bolts must be screwed into the nuts. Furthermore, due to the weather exposure which occurs on building sites, bolts are liable to rust and deteriorate thereby increasing the difficulty of assembling the scaffolding.

SUMMARY OF THE INVENTION

An object of the present invention is to at least reduce these disadvantages by providing a robust coupling which eliminates the need for nuts and bolts.

According to the present invention there is provided a coupling for use in the construction of a scaffolding assembly. The coupling includes a central link, two pairs of arms projecting from the link, each arm having an aperture therein and each pair of arms being intended to embrace a respective scaffolding member, and a pair of wedges adapted to project through the apertures in a respective pair of arms to bear upon and retain in position an embraced scaffolding member, in which each wedge is provided with stop members to resist withdrawal from the apertures.

The stop members extend outwardly from opposite sides of each wedge to a width greater than a dimension of one aperture of each pair of arms. The wedges are made from an elongated trapezoidal blank strip, which is bent to have a U-shaped cross-section, and the stop members are formed by bending outwardly opposite corners of the thinner end of each wedge. The other apertures of each arm pair have lateral recesses through which the stop members pass. Consequently, the wedges can be slid freely into the apertures of each pair of arms before the scaffolding members are embraced, but the wedges cannot be separated from the fully assembled coupling and scaffolding members because the stop members when inserted block one of the apertures of each arm pair.

To satisfy certain standards which prohibit direct contact of the wedges with scaffolding tubes, two flat base plates are provided, each of which is inserted beneath a wedge in the apertures of each pair of arms.

According to a preferred embodiment, each base plate includes a rectangular plate provided at the ends of its longitudinal sides with four projections which serve to prevent the withdrawal of the base plate from the apertures. The apertures of the arms are shaped and dimensioned such that while the base plates can be introduced thereinto, for example, by inclining them relative to their normal position of use, they cannot be withdrawn from the apertures once in place.

One embodiment of a coupling arrangement according to the invention will now be described with reference to the attached drawings.

BRIEF DESCRIPTION OF THE DRAWINGS

FIG. 2 is a plan view of a blank from which a coupling member of the coupling arrangement shown in FIG. 1 is made.

FIGS. 3 to 5 show a wedge member of the coupling arrangement during three successive stages of its manufacture.

FIG. 6 shows a base plate for separating the wedge member and a scaffolding tube.

DESCRIPTION OF THE PREFERRED EMBODIMENTS

Figure 1:
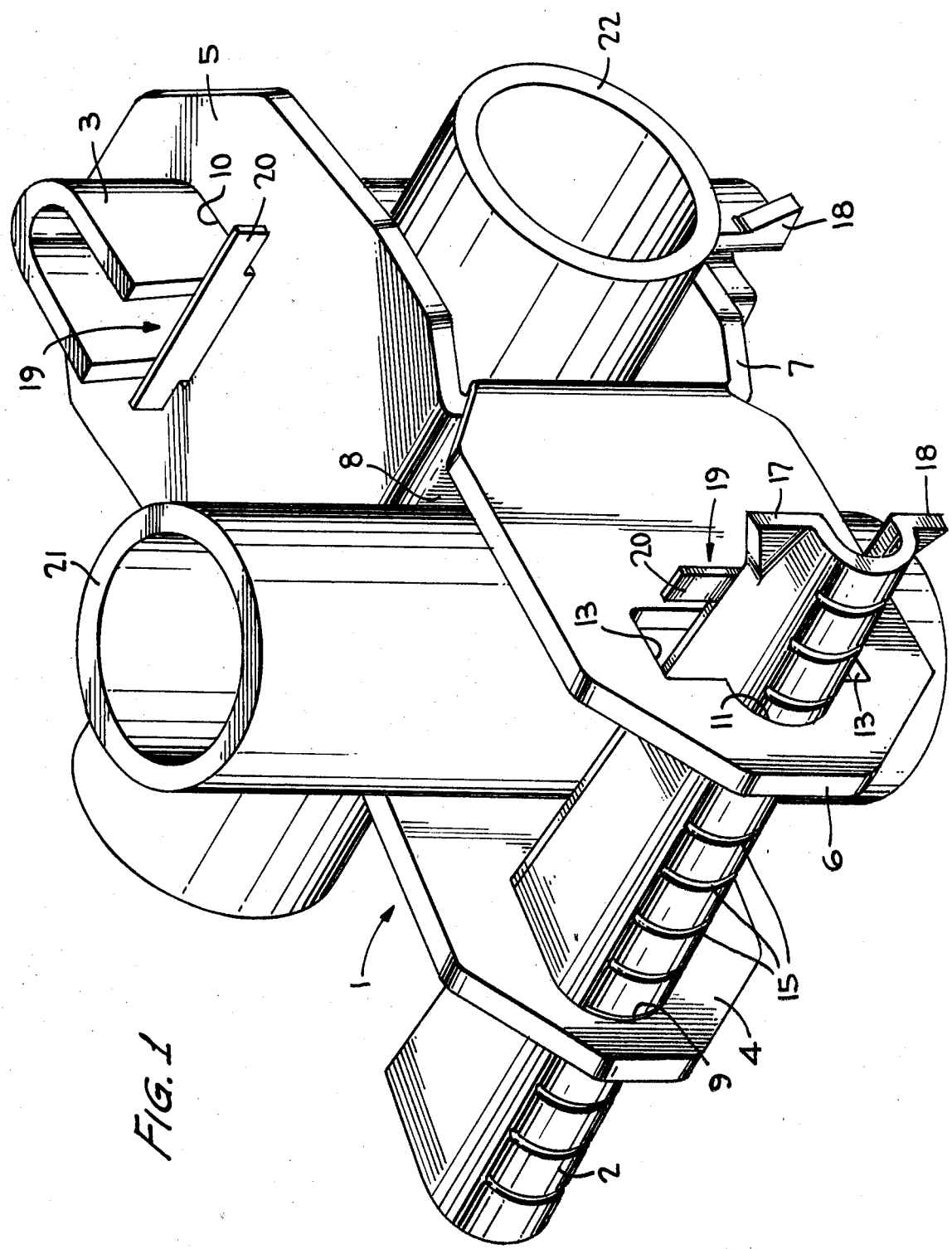
FIG. 1 is a general perspective view showing the assembly of two scaffolding tubes by the use of a coupling arrangement according to the invention.

Referring to FIG. 1, the coupling arrangement includes a coupling member 1 and two wedges 2 and 3. As shown in FIG. 2, the coupling member 1 is made from a cross-shaped metal blank having four arms 4 to 7, connected to a central portion 8, and each perforated with apertures 9 to 12 respectively. Apertures 9 and 10 of the two contiguous arms 4 and 5 have a rectilinear edge and a rounded edge whose concavity is turned towards the central portion 8. The height of apertures 9 and 10 is greater than the width. Apertures 11 and 12 formed on the two other arms have the same dimensions as apertures 9 and 10, but each has on its base two lateral slots 13.

The blank of FIG. 2 is brought into the shape of the coupling member shown in FIG. 1 by bending arms 4 and 6 on one side of central portion 8 until they are substantially perpendicular to the latter, and by bending in the same way arms 5 and 7 on the other side of the central portion.

Each of the wedges is made from an elongated metal blank strip 14 of trapezoidal shape as shown in FIG. 3. A plurality of notches 15 are formed on the flat surface of blank 14, with the notches being parallel to the base of the blank. With the aid of a press the blank is shaped into a member 16, as shown in FIG. 4, having a U-shaped cross-section whose outer surface is shaped in complementary manner to that of the rounded edge of apertures 9 to 12. After introducing the thinnest end of each member 16 through two apertures of a respective pair of arms, the corners thereof are twisted towards the outside in such a way as to form two horns 17 and 18 constituting stop members. The deformation can be such that the distance between the ends of the horns is greater than the width of apertures 9 and 10 but less than the width of apertures 11 and 12 level with recesses 13.

Between the wedges and the tubes to be assembled are inserted base plates 19, one of which is shown in detail in FIG. 6. The base plate includes a rectangular rigid plate provided at the ends of its longitudinal sides with four projections 20. The length of the portion of the base plate between the projections is at least equal to the distance separating the outer faces of one pair of arms and the width of the portion of the base plate is slightly less than the width of apertures 9 and 10. Moreover, the width of the base plate level with projections 20 is greater than the width of apertures 9 and 10, but less than the height of the latter. As a result of this dimensioning, the plates can be introduced into the apertures by inclining them in the direction of the height of the apertures. On turning the base plates again in the direction of the width of the apertures, they then cannot separated from the coupling member.

Each wedge can have a plurality of protruberances along its facing side. These protruberances, which could either be in addition or alternative to the notches, are arranged in the same manner as the notches.

The coupling according to the invention is assembled in the works in such a way that a ready-to-use product is obtained. The assembly method is described below.

First of all the base plates are fitted by placing them in front of apertures 9 and 10 and respectively orientating them in the direction of the height of these apertures. Projections 20 can freely traverse the apertures in view of the relative dimensions of these and the base plates. The base plates are then pivoted by 90°.

The wedges are then fitted into the apertures. To do this, the wedges 16 as shown in FIG. 4 are used. The tapered ends of the wedges are introduced into apertures 9 and 10, and then into apertures 11 and 12. The horns 17 and 18 of the wings at the tapered ends are then bent towards the outside. The wedges and base plates are then definitively integral with the coupling member 1. However, they can freely slide through the slotted apertures 11 and 12 because the width of the base plates level with the projections, as well as the width between the horns 17 and 18 of the wedges are less than the width of the apertures 11 and 12 level with recesses 13.

To assemble two scaffolding tubes 21 and 22, the base plates and wedges are withdrawn from apertures 11 and 12 until the projections 20 and horns 17 and 18 strike against the inner surface of arms 4 or 5. Then tubes 21 and 22 are inserted between arms 4 and 6 and 5 and 7 respectively, and the wedges and base plates are pushed through the slotted apertures 11 and 12 and then are jammed by means of hammer blows. Tubes 21 and 22 are then locked against the central portion 8. The notches 15 formed on the outer surface of the wedges prevent a sliding or untimely withdrawal of the wedges under the action of vibrations. According to the invention, the effectiveness of these notches is increased if, during manufacture, arms 4 and 5 are inclined slightly outwardly in such a way that the notches are hooked on the outer edges of apertures 9 and 10.

To free tubes 21 and 22 a hammer blow is applied to the narrow edges of the wedges. However, the wedges and base plates are not separated completely from the coupling member 1. This represents one of the advantages of the invention because in this way there is no danger that the wedges accidentally fall or get lost.

It should be noted that in the operating position wedges 2 and 3 bring about an elastic deformation of the tubes which contributes towards the prevention of accidental unlocking of the wedges. Thus the latter continue to exert their locking action even if they are slightly displaced towards the aperture as a result of vibrations or shocks.

The described coupling therefore offers complete safety and reliability, but is still extremely simple to assemble and disassemble.

Each of the arms 4 to 7 has a width L (see FIG. 2) which is relatively large, for example 8 cm, so that each offers an immediate support point to the respective scaffolding tubes 21 and 22. The connecting points of the tubes thus become semifixation points. Consequently the buckling lengths of the tubes are reduced and the tubes are able to withstand greater loads. If the width L of the arms is too small, for example less than 5 cm, the connection between the scaffolding tubes becomes an articulated-type connection.

Tests have shown that a coupling member 1, which is cut from a 6 mm thick metal sheet and has arms 4 to 7 about 7 cm wide, is able to resist a force of 1,800 applied for example by means of a hydraulic jack at one end of one of the tubes. This performance is very satisfactory in view of the normal load which has to be borne by a coupling which is of the order of 750 kg.

The coupling according to the invention also has the advantage of being of very simple in construction because it requires neither screws, bolts nor hinges and because it can be mass produced at competitive prices.

It is noted that the above description and the accompanying drawings are provided merely to present an exemplary embodiment of the present invention and that additional modifications of such embodiments are possible within the scope of this invention without deviating from the spirit thereof.

What I claim is:

1. A coupling for scaffolding comprising a central link, two pairs of arms projecting from the link, each arm having an aperture therein, and each pair of arms being adapted to embrace a respective scaffolding member, and a pair of wedges, each being generally U-shaped in transverse cross-section, each wedge being adapted to project through the apertures in a respective one of said pairs of arms and arranged so that the free edges of the U-shaped cross-section bear upon and retain in position an embraced scaffolding member, each wedge being provided with a pair of stop members to resist withdrawal of said wedge from said respective apertures and each wedge having a plurality of notches in the bottom of the U-shaped cross-section, said notches being arranged to bear against said arms thereby locking said wedges within said apertures in said arms.

2. A coupling as defined in claim 1, wherein said stop members extend outwardly from opposite sides of each wedge to a width greater than a dimension of one aperture of each said pair of arms.

3. A coupling as defined in claim 2, wherein said other aperture of each pair of arm has lateral recesses through which said stop members can pass.

4. A coupling as defined in claim 1, wherein there are a plurality of said notches, said notches being longitudinally spaced and transversely extending along facing sides of each said wedge.

5. A coupling as defined in claim 1, wherein a plurality of both notches and protruberances are located along the facing sides of each of said wedges.

6. A coupling as defined in claim 1, further comprising a base plate located between each of said wedges and its embraced scaffolding member.

7. A coupling as defined in claim 1, wherein each of said wedges has at least one protruberances located on its facing side.

8. A coupling as claimed in claim 7, wherein there are a plurality of said protruberances, being longitudinally spaced are transversely extending along the facing sides of each said wedge.

9. A coupling for scaffolding comprising a central link, two pairs of arms projecting from the link, each arm having an aperture therein, and each pair of arms being adapted to embrace a respective scaffolding member, and a pair of wedges, each of said wedges being made from an elongate trapezoidal blank bent to have a U-shaped cross-section, each wedge being adapted to project through the apertures in a respective one of said pairs of arms to bear upon and retain in position an embraced scaffolding member and each wedge being provided with a pair of stop members to resist withdrawal of said wedge from said respective apertures, said stop members being formed by bending outwardly opposite corners of the thinner end of each said wedge and said stop members extending outwardly from opposite sides of each wedge to a width greater than a dimension of one aperture of each said pair of arms and said other aperture of each said pair of arms having lateral recesses through which said stop members can pass.

10. A coupling for scaffolding comprising a central link, two pairs of arms projecting from the link, each arm having an aperture therein, and each said pair of arms being adapted to embrace a respective scaffolding member, and a pair of wedges, each wedge being adapted to project through the apertures in a respective one of said pairs of arms to bear upon and retain in position an embraced scaffolding member, each wedge being provided with a pair of stop members to resist withdrawal of said wedge from said respective apertures and a base plate located between each of said wedges and its embraced scaffolding member, said base plate being a rectangular plate having a pair of projections at each end extending outwardly to a width greater than a dimension of one aperture of each said pair of arms.

11. A coupling as defined in claim 10, wherein said base plate has a length between said projections which is greater than the distance between the outer surfaces of said arms of each of said pair of arms.

12. A coupling as defined in claim 10, wherein each of said projections has a width less than the dimension of only part of the other aperture of each of said pair of arms.

* * * * *

UNITED STATES PATENT OFFICE
CERTIFICATE OF CORRECTION

Patent No. 4,077,730                Dated March 7, 1978

Inventor(s) Joseph Maurice Zaidan

It is certified that error appears in the above-identified patent and that said Letters Patent are hereby corrected as shown below:

The term of this patent subsequent of January 21, 1992 has been disclaimed.

Signed and Sealed this

Eighth Day of August 1978

[SEAL]

Attest:

RUTH C. MASON
*Attesting Officer*

DONALD W. BANNER
*Commissioner of Patents and Trademarks*